United States Patent [19]

Kitta et al.

[11] Patent Number: 4,767,920

[45] Date of Patent: Aug. 30, 1988

[54] READER AND WRITER FOR AN IC CARD

[75] Inventors: Kenichi Kitta, Tokyo; Touru Shinagawa, Ibaragi; You Takamori, Kokubunji, all of Japan

[73] Assignee: Hitachi Maxell, Ltd., Osaka, Japan

[21] Appl. No.: 863,790

[22] Filed: May 16, 1986

[30] Foreign Application Priority Data

May 18, 1985 [JP] Japan .................. 60-104939

[51] Int. Cl.4 .............................. G06K 19/06
[52] U.S. Cl. .................... 235/492; 235/487; 235/380
[58] Field of Search ............. 235/380, 492, 487

[56] References Cited

U.S. PATENT DOCUMENTS 4,614,861 9/1986 Pavlov .................. 235/381

Primary Examiner—Harold I. Pitts
Attorney, Agent, or Firm—Birch, Stewart, Kolasch, & Birch

[57] ABSTRACT

In an IC card reader and writer there is provided a judging means for judging the type of IC card inserted in the card reader and writer so as to make the card reader and writer compatible with various kinds of IC cards by providing a suitable power supply for accessing information stored in a particular type of memory in the IC card.

6 Claims, 5 Drawing Sheets

4,767,920

READER AND WRITER FOR AN IC CARD

BACKGROUND OF THE INVENTION

1. FIELD OF THE INVENTION

The present invention relates to a reading and writing device for use in reading and writing information in an IC card.

2. DESCRIPTION OF THE PRIOR ART

There have been used vending machines which sell goods by use of a card, without the payment of money. As commercially available cards, there are various kinds such as magnetic cards in which a magnetic sheet is installed or IC cards having a data processing unit in the form of an integrated circuit. However, the memory capacity of magnetic card is not so large and the memory capacity of a conventional IC card using RAM (random access memory) is limited by a power supply used in the IC card.

In order to increase the memory capacity of the IC card, the present inventors have proposed an IC card using a PROM (programmable read only memory). In the proposed IC card, a battery is unnecessary for maintaining the data in the PROM, whereby the capacity of the memory can be increased.

FIG. 1 shows one example of the proposed IC card, where 1 denotes the body of, 2 denotes a circuit board, 3-1 to 3-8 denote external connecting terminals for a power supply, data input and output, clock input and ground. 4 denotes a data processor, and 5 denotes a PROM for storing data.

As shown in FIG. 1, in the proposed IC card, there is a recess in which the circuit board having the data processor 4 and IC PROM is embedded. The external terminals 3-1 to 3-8 are formed on the circuit board 2 so that the external terminals are exposed 1 for connection with an external circuit arrangement. When the proposed IC card is inserted in a card reader and writer (not shown), the circuits in the IC card and the card reader and writer are coupled through the external terminals 3-1 to 3-8 so as to couple the data processor 4 with a host computer connected to the card reader and writer.

The PROM 5 is used for storing data and the data processor 4 processes the data from the card reader and writer or from PROM 5 based on the program stored in the data processor 4.

The circuit arrangement of the IC card is shown in FIG. 2 in which 6 denotes a program memory, 7 denotes CPU, 8 denotes an address decoder, 9 denotes a data bus and 10 denotes an address bus. The program memory 6 stores a processing program and CPU 7 operates to write in and read out the data stored in PROM 5 upon execution of the process program from the program memory 6 by accessing sequentially the addresses of the program memory 6 through the address bus 10 and the address decoder 8. For writing the data in the IC card, data supplied from the card reader and writer through the data bus 9 can be written in a predetermined address of PROM 5 designated by the address signal fed from the CPU 7 through the address bus 10 and the address decoder 8. For reading the data, a predetermined address of PROM 5 is designated by CPU 7 through the address bus 10 and address decoder 8 and the data read out from the designated address of PROM 5 is sent to the host computer through the data bus 9.

As the PROM which is a non-volatile memory, EPROM, EEPROM and fuse ROM are used. These ROMs are respectively different in driving characteristics. The conventional card reader and writer is operable for only one type of driving conditions, therefore, a conventional card reader and writer can not be used for the various types of PROMs. For example, the card reader and writer designed for a card using the EPROM requires a power source for supplying +21 volt of write-in voltage. The card reader and writer for a card using EEPROM requires a power supply for generating +5 volt write-in voltage. In case an IC card of which the write-in voltage is not compatible is inserted in one card reader and writer, erroneous data may be written in the memory and in the worst case, PROM 5 may be damaged. Thus, in order to make the IC cards practical for use, it is essential to provide a card reader and writer which is compatible to various IC cards having different drive conditions.

SUMMARY OF THE INVENTION

An essential object of the present invention is to provide a card reader and writer which is compatible with various kinds of IC cards having different driving conditions.

According to the present invention, there is provided a card reader and writer for transferring data between a host computer and an IC card having IC memory means for storing data under a predetermined write-in condition, said card reader and writer comprising means for judging the write-in conditions of the IC card and means for changing the write-in condition of the card reader and writer corresponding to the result of the judgment.

DETAILED DESCRIPTION OF THE PREFERRED EMBODIMENT

Figure 3:
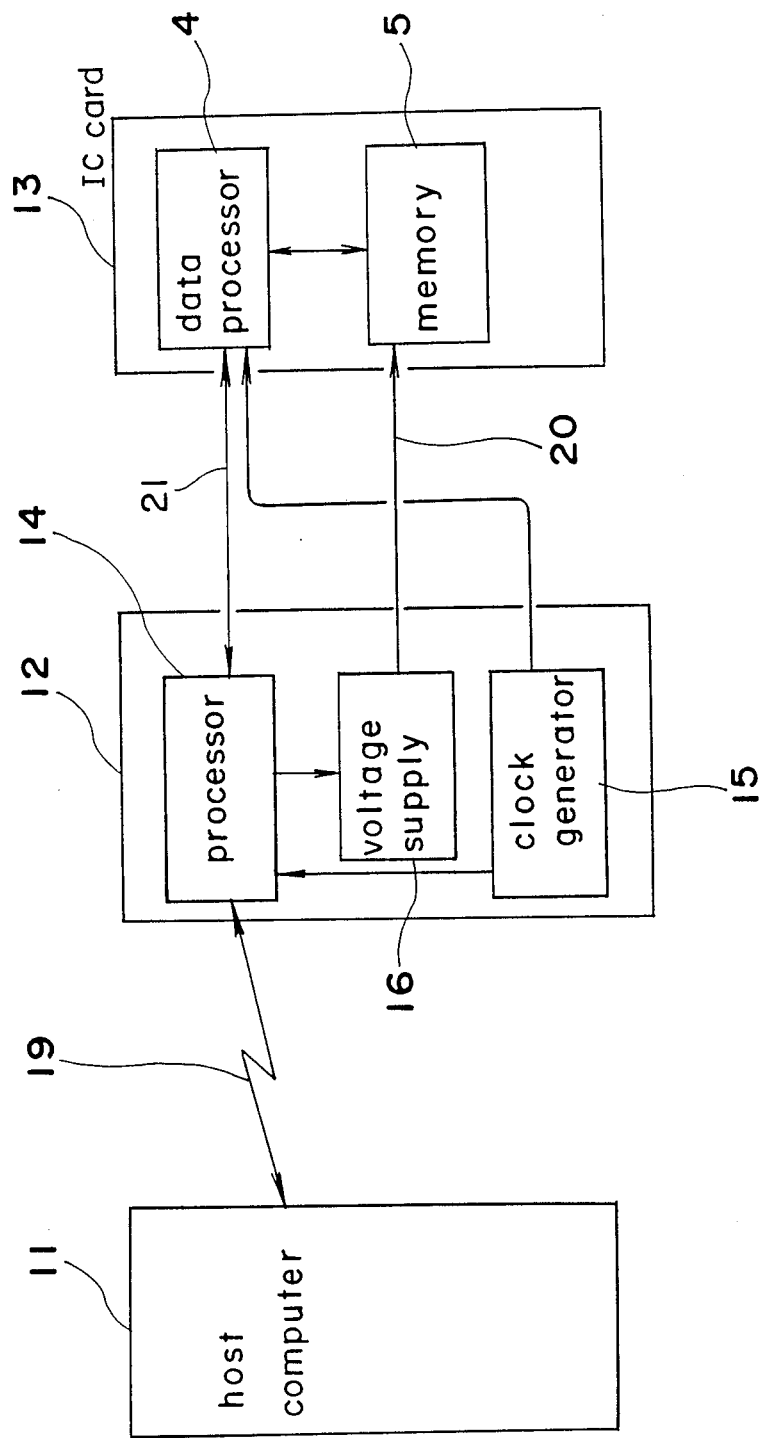
FIG. 3 is a block diagram showing an embodiment of a card reader and writer according to the present invention.
Figure 4:
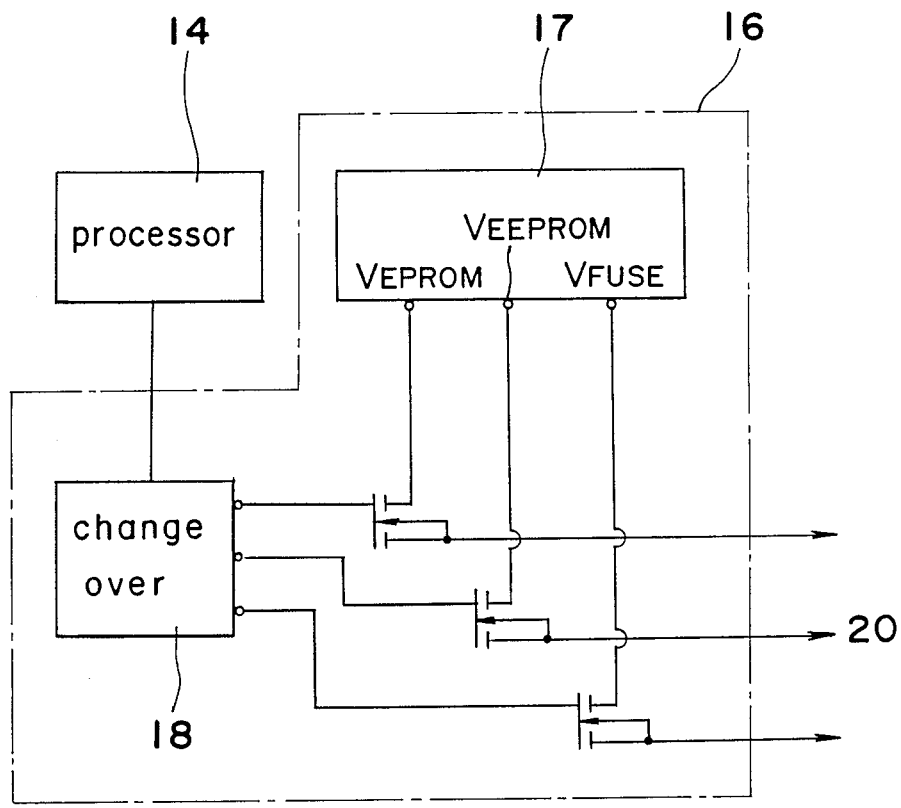
FIG. 4 is a block diagram showing an example of a write-in power supply circuit used in the card reader and writer shown in FIG. 3.
Figure 5:
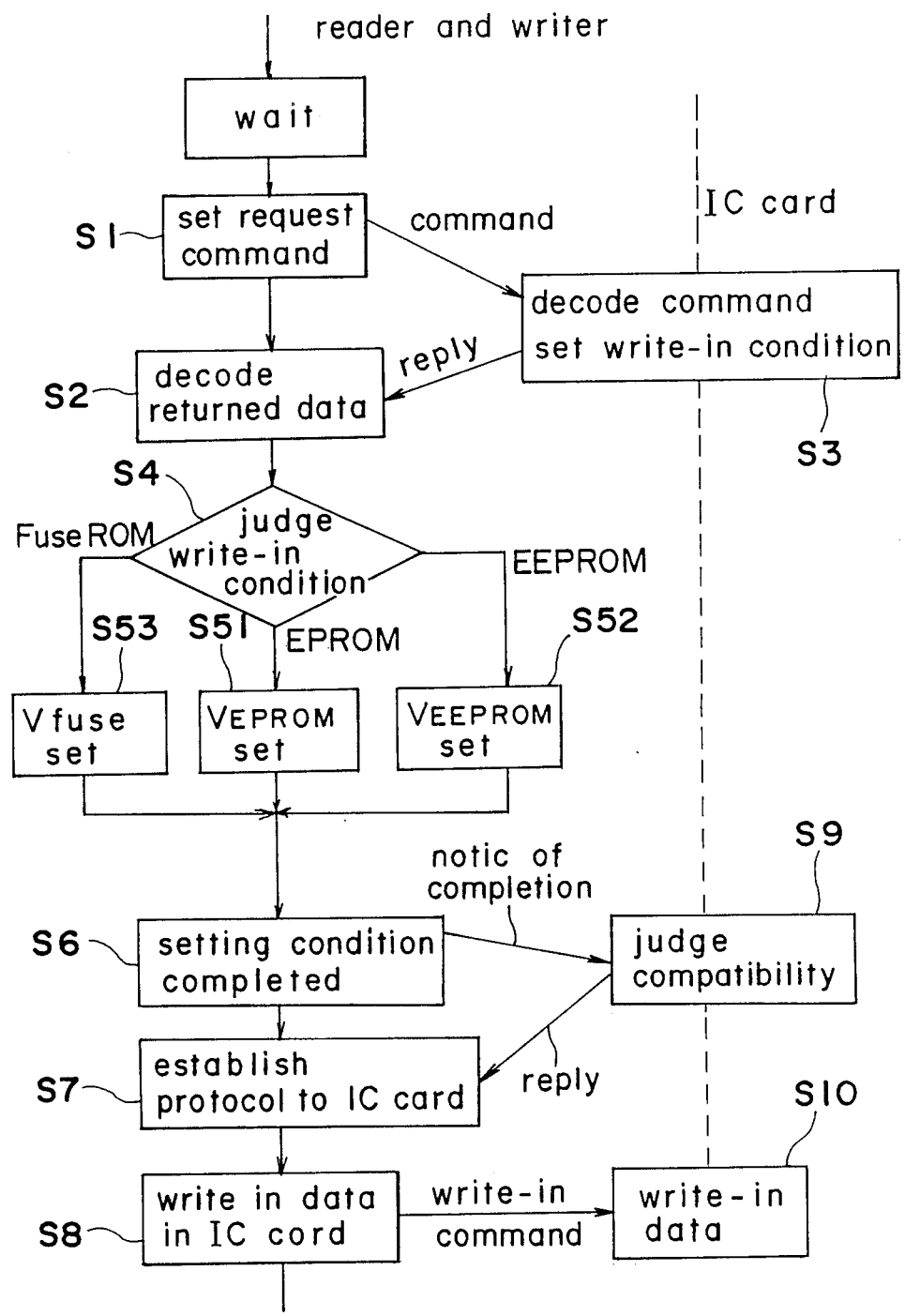
FIG. 5 is a flow chart showing the operation of the card reader and writer shown in FIG. 3.

Referring to FIG. 3 showing an example of a card reader and writer according to the present invention, 11 denotes a host computer, 12 denotes a card reader and writer, and 13 denotes an IC card.

The host computer 11 sends a command signal to the card reader and writer 12 and the IC card 13 and processes data upon receipt of the data from the IC card 13.

Figure 1:
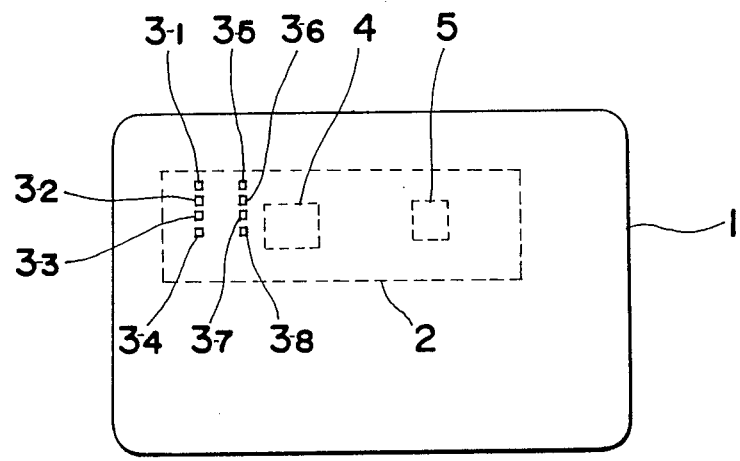
FIG. 1 is a top plan view showing an example of an IC card using PROM.
Figure 2:
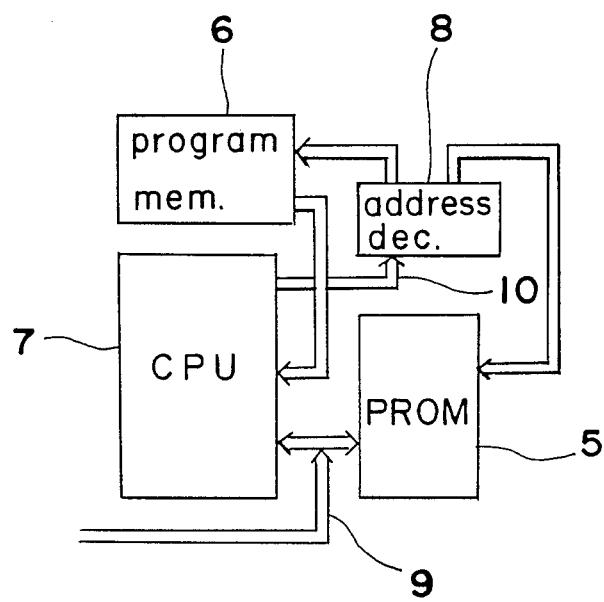
FIG. 2 is a block diagram of a circuit arrangement used in the IC card shown in FIG. 1.

In the card reader and writer 12, there are provided a microprocessor 14 for judging the types of IC cards and producing a control signal representing the types of IC card by eading the data stored in the memory 5 of the IC card 13, a clock signal generator 15 and a power voltage supply 16 for supplying a suitable write-in voltage for writing the data in the IC card 13. The voltage supply 16 is provided with a power supply 17 arranged to supply a write-in voltage $V_{EPROM}$ for writing data in an EPROM, a second voltage $V_{EEPROM}$ for writing data in an EEPROM, a third voltage $V_{FUSE}$ for writing data in a fuse ROM and a selector 18 for selecting the output voltages of the power supply 17 in response to the control signal from the microprocessor 14. The IC card 13 is the same as the IC card shown in FIGS. 1 and 2 except that data representing the driving condition of the IC card such as the write-in voltage is written in the memory 5. Therefore, like parts in FIGS. 1 and 2 are designated by like reference numerals and the details thereof are herein omitted. In the embodiment shown in FIG. 3, although the data processor 4 and memory 5 are shown separated, this is not essential but may be provided in various forms, for example, the memory 5 may be included in the data processor 4. In FIG. 3, 19 denotes a bidirectional I/O signal line for communicating between the card reader and writer 12 and the host computer 11 to send the serial data, and 20 denotes a voltage signal for writing-in the data in the data memory 5.

In operation, upon insertion of the IC card 13 in the card reader and writer 12, the presence of the IC card is detected by the card reader, writer 12 and the clock signal generator 15 starts, and the microprocessor 14 and the IC card 13 are driven. The microprocessor 14 sends a command signal requesting the write-in voltage data i.e., the access condition of the IC card, to the CPU 7 installed in the IC card 13 through the I/O line 21 in the step S1. The CPU 7 decodes the command in the step S3 and returns the access information for the data memory 5 to the microprocessor 14 through the I/O signal line 21. Then the microprocessor 14 decodes the returned information in the step S2 and the program flow goes to the step S4 wherein the access information or the type of write-in voltage is detected. When the information from the IC card 13 is access information of an EPROM, the microprocessor 14 produces a control signal of 2 bits such as (01) in the step S51. By this operation, the selector 18 is changed over to supply the write-in voltage $V_{EPROM}$ suitable for the EPROM in the step S6. In case the IC card having an EEPROM is set in the card reader and writer 12, the microprocessor 14 generates a control signal (10) of 2 bits representing the EEPROM so that the selector 18 supplies the write-in voltage $V_{EEPROM}$. In case the IC card having a fuse memory is set in the card reader and writer 12, the microprocessor 14 decodes data from the IC card 13 in a similar manner as mentioned above so as to supply a write-in voltage of $V_{fuse}$.

After setting the write-in voltage from the power supply 16 of the card reader and writer 12 as mentioned above, the microprocessor 14 sends a signal representing that the initial condition is completely set to the host computer 11 through the I/O signal source 19 in the step S6. Thus data communication between the host computer 11 and the IC card 13 is established to write in data in the IC card 13 in the steps S7 to S10.

In the above embodiment, the card reader and writer 12 is provided with a processor for judging the types of data memory mounted on a IC card and the power supply for supplying the most suitable write-in voltage on the basis of the result of the judgment. The card reader and writer may be compatible with IC cards using any one of the memories such as EPROM, EEPROM and fuse ROM. As the processor 14 is provided in the card reader and writer 12 so as to set the write-in condition without using the host computer, the period of time between insertion of the IC card in the card reader and writer and the setting of the drive condition is shortened. It is also an advantage that there is no need to load the burden of the condition setting to the host computer.

Although in the preferred embodiment mentioned above, a microprocessor 14 is used to read the write-in condition of the data memory, the scope of the present invention is not limited to the embodiment described above, for example, mechanical means, electrical means or optical means may be used as the device for judging the write-in condition.

Figure 6:
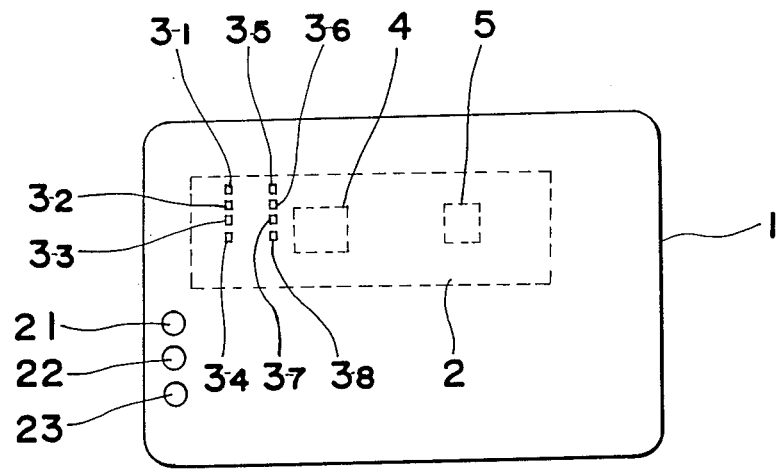
FIG. 6 is a top plan view of one modification of the IC card according to the present invention.
Figure 7:
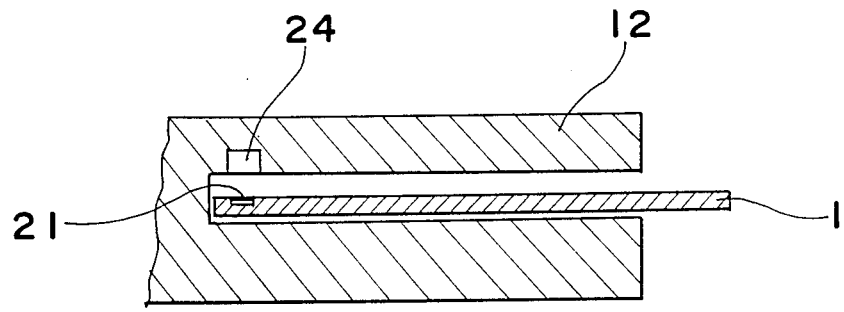
FIG. 7 is a cross sectional view showing an essential portion of the IC card shown in FIG. 6.

Referring to FIGS. 6 and 7, there can be provided any one of light reflecting members 21, 22 and 23 on one side edge portion of the IC card 13 corresponding to the write-in condition, for example the EPROM, EEPROM or fuse ROM. The card reader and writer 12 is provided with light emitting and receiving devices (only one device 24 corresponding to the light reflecting member 21 is depicted in FIG. 7) juxtaposed corresponding to the position of the light reflecting members 21, 22 and 23. When the IC card 13 with the light reflecting member 21 is inserted into the card reader and writer 12, the light receiving device 24 detects the light reflecting member 21 so that one of the write-in voltages is selected. Light reflecting members 21 to 23 may be formed by an aluminum vaporing in the form of a circular shape. Also, in place of using light reflecting members and a light emitting and receiving device, mechanical contacts may be used.

It is an advantage of the present invention that the card reader and writer according to the present invention can act to automatically select the write-in voltage condition depending on the types of IC card inserted. The card reader and writer is compatible with the various types of IC card, so that the practical usefulness of the card reader and writer is increased.

It is another advantage that since the processor for judging the type of IC card is provided in the card reader and writer, the processing speed is increased whereby no additional load is presented to the host computer.

What is claimed is:

1. An integrated circuit (IC) card reader and writer for transferring data between a host computer and an IC card inserted in the IC card reader and writer, said IC card containing memory means for storing data indicating a write-in voltage level to be used in the transfer of data to said IC card, comprising:
    means for determining the write-in voltage level of the IC card inserted in said reader and writer from said data stored in said memory means; and
    power supply means for providing a write-in voltage corresponding to the voltage level determined by said means for determining.

2. The card reader and writer defined in claim 1, wherein said means for determining comprises a microprocessor for reading data stored in said memory means of said IC card.

3. The card reader and writer defined in claim 1, wherein said memory means comprises optical means for storing said data, and said means for determining comprises optical reader means for optically detecting said data.

4. The card reader and writer defined in claim 1, wherein said memory means comprises mechanical means for storing said data, and said means for determining comprises mechanical reader means for mechanically detecting said data.

5. The card reader and writer defined in claim 1, wherein said power supply means comprises means for selecting one of a plurality of write-in voltage levels based on the determination by said means for determining.

6. The card reader and writer of claim 5, wherein said plurality of write-in voltage levels correspond to driving requirements of EPROM, EEPROM and fuse ROM memories which may be contained in said IC card.

* * * * *